United States Patent
Shoyama

(10) Patent No.: US 8,638,377 B2
(45) Date of Patent: Jan. 28, 2014

(54) SOLID STATE IMAGE PICK-UP DEVICE, SEMICONDUCTOR DEVICE, AND CAMERA SYSTEM HAVING AUXILIARY REPLACEMENT PIXELS

(75) Inventor: Hideki Shoyama, Fukuoka (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 12/538,126

(22) Filed: Aug. 8, 2009

(65) Prior Publication Data

US 2010/0079647 A1    Apr. 1, 2010

(30) Foreign Application Priority Data

Sep. 30, 2008   (JP) .................................. 2008-252262

(51) Int. Cl.
*H04N 9/64* (2006.01)
*H04N 3/14* (2006.01)

(52) U.S. Cl.
USPC .......................................... 348/246; 348/308

(58) Field of Classification Search
USPC .................. 348/308–310, 246–247
See application file for complete search history.

(56) References Cited

U.S. PATENT DOCUMENTS

| | | | |
|---|---|---|---|
| 5,198,908 A | 3/1993 | Kurosawa | |
| 5,973,311 A * | 10/1999 | Sauer et al. | ................. 250/208.1 |
| 6,483,541 B1 | 11/2002 | Yonemoto et al. | |
| 6,794,627 B2 * | 9/2004 | Lyon et al. | ................. 250/208.1 |
| 6,914,227 B2 * | 7/2005 | Kaifu et al. | ................. 250/208.1 |
| 7,027,089 B2 * | 4/2006 | Kwon et al. | ................... 348/247 |
| 7,034,873 B2 * | 4/2006 | Mendis et al. | ................. 348/246 |
| 7,064,768 B1 * | 6/2006 | Bao | ............................... 345/589 |
| 7,408,578 B2 * | 8/2008 | Chapman et al. | ............. 348/308 |
| 7,499,599 B2 * | 3/2009 | Lokenberg Dixon et al. | ............................. 382/275 |
| 7,830,432 B2 * | 11/2010 | Henderson | .................... 348/294 |
| 7,875,840 B2 * | 1/2011 | Jiang et al. | .................. 250/208.1 |
| 7,952,621 B2 * | 5/2011 | Yamauchi | ..................... 348/243 |
| 2003/0151686 A1 * | 8/2003 | Koyama | ......................... 348/304 |
| 2006/0261431 A1 * | 11/2006 | Kim et al. | ..................... 257/462 |
| 2007/0222872 A1 * | 9/2007 | Satou | ............................ 348/246 |

FOREIGN PATENT DOCUMENTS

| | | |
|---|---|---|
| JP | 04-160883 | 6/1992 |
| JP | 10-126697 | 5/1998 |
| JP | A 2000-059692 | 2/2000 |
| JP | T 2006-526959 | 11/2006 |

* cited by examiner

*Primary Examiner* — Ngoc-Yen Vu
(74) *Attorney, Agent, or Firm* — Robert J. Depke; The Chicago Technology Law Group, LLC

(57) ABSTRACT

A solid-state image pickup device includes a pixel array including pixels, each having a photoelectric conversion element and a detecting unit detecting an acquired electric signal, arranged in a matrix, a signal line provided for each column of the pixel array and connected to the detecting unit through a switching element, a selection line provided for each row of the pixel array and supplied with a selection pulse causing the switching element to conduct, a resetting unit provided in each pixel constituting the pixel array and applying a predetermined potential to the detecting unit of the pixel, and an output control unit provided in each pixel constituting the pixel array and causing the switching element of the pixel to conduct according to the selection pulse supplied to another selection line connected to another switching element of another pixel belonging to another row.

18 Claims, 8 Drawing Sheets

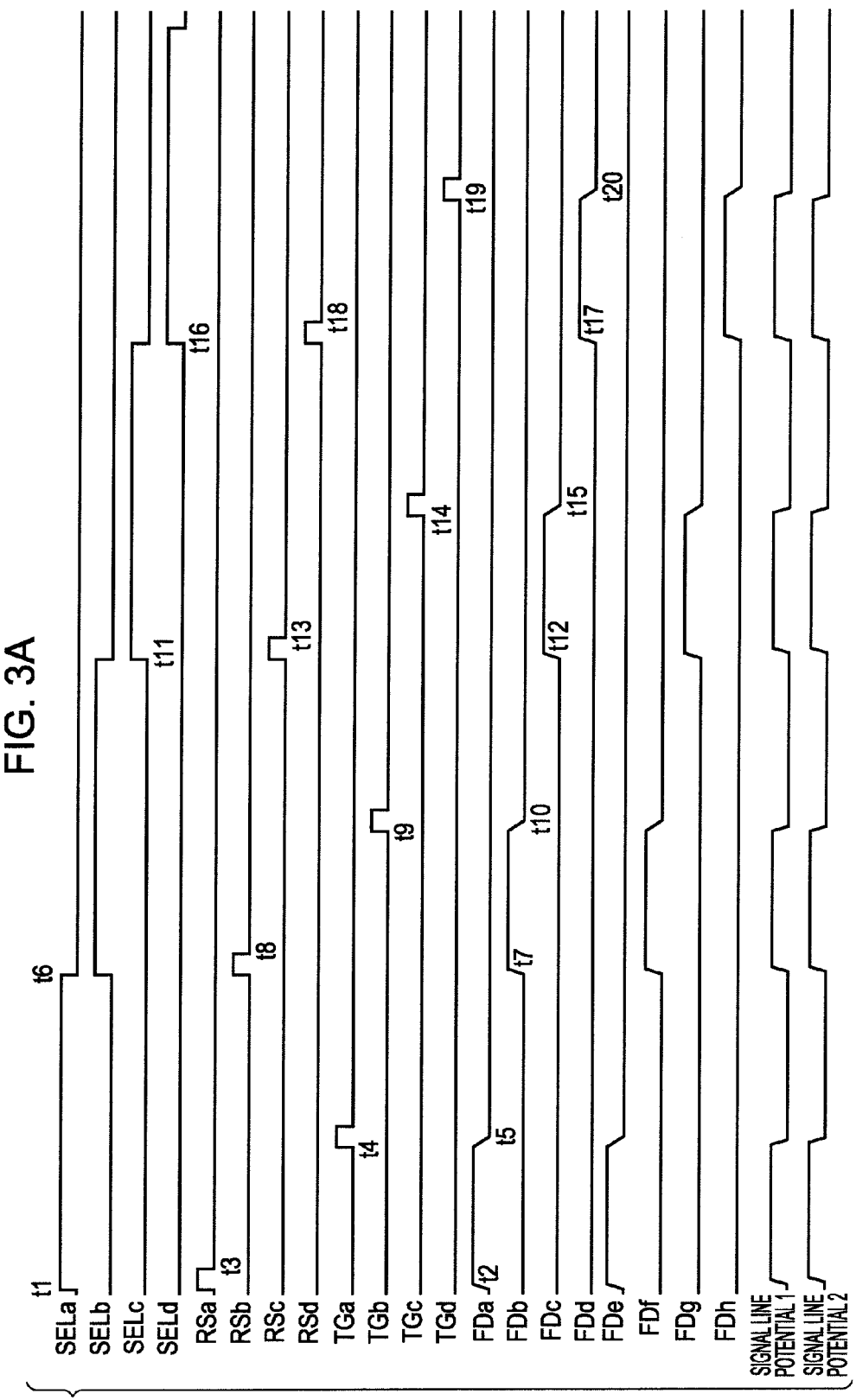

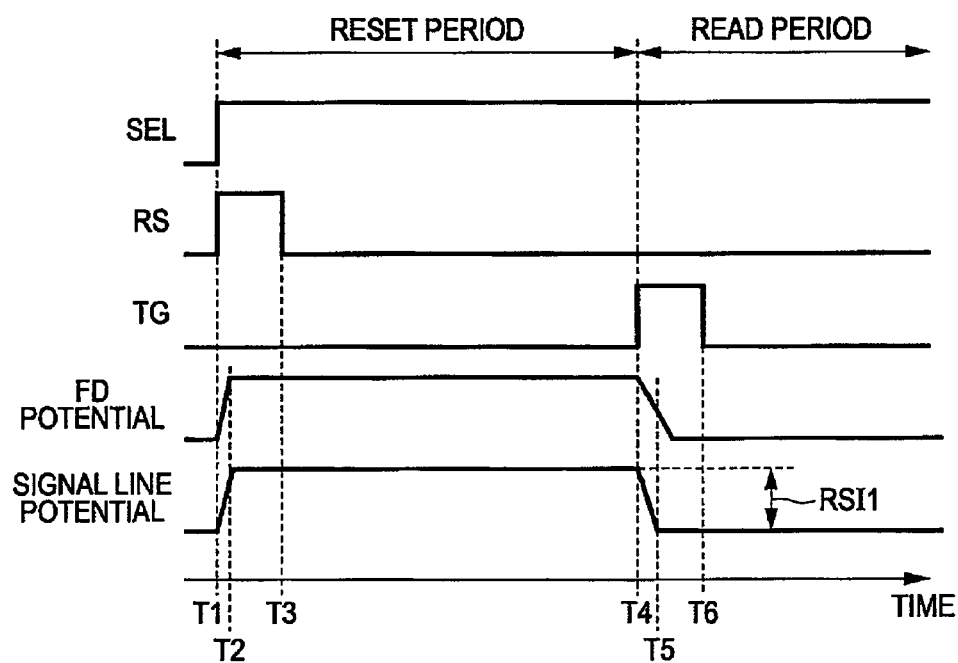

SOLID STATE IMAGE PICK-UP DEVICE, SEMICONDUCTOR DEVICE, AND CAMERA SYSTEM HAVING AUXILIARY REPLACEMENT PIXELS

BACKGROUND OF THE INVENTION

1. Field of the Invention

The present invention relates to solid-state image pickup devices, semiconductor devices, and camera systems. More particularly, the present invention relates to a solid-state image pickup device, a semiconductor device, and a camera system including regularly arranged elements (e.g., photoelectric conversion elements).

2. Description of the Related Art

Recently, solid-state image pickup elements, such as complementary metal oxide semiconductor (CMOS) image sensors, have been widely used as image input devices of image capturing apparatuses included in various mobile terminals, such as mobile phones, and of image capturing apparatuses, such as digital still cameras or digital video cameras (see, for example, Japanese Unexamined Patent Application Publication No. 10-126697).

FIG. 4 is a schematic diagram illustrating a CMOS image sensor. The CMOS image sensor includes an pixel array 202 in which many pixels 201 each including a photoelectric conversion element are arranged in a matrix form and a vertical scanning circuit 203 for selecting each pixel in the pixel array 202 on a row-by-row basis and controlling a shutter operation and a readout operation of the pixel. The CMOS image sensor also includes a column signal processing unit 204 for reading out a signal from the pixel array 202 and performing predetermined image processing (e.g., correlated double sampling (CDS) processing, auto gain control (AGC) processing, and analog/digital conversion processing) on a column-by-column basis. Furthermore, the CMOS image sensor includes a horizontal scanning circuit 206 for selecting the signal of the column signal processing unit 204 one by one and supplying the selected signal to a horizontal signal line 205, and a data signal processing unit 207 for converting the signal fed from the horizontal signal line 205 into an intended output data format. The CMOS image sensor also includes a timing generator 208 for supplying various pulse signals used in an operation of each unit on the basis of a reference clock. Herein, the CDS processing indicates processing for eliminating a fixed pattern noise resulting from variance in thresholds of pixel transistors. The AGC processing indicates auto gain control processing.

As shown in FIG. 5, each pixel 201 included in the pixel array 202 has a photoelectric conversion element (e.g., a photodiode) 101, a transfer transistor 102, a reset transistor 103, an amplifying transistor 104, and a selecting transistor 105. FIG. 5 shows an example circuit that uses N-channel MOS (NMOS) transistors as the transistors 102-105.

The transfer transistor 102 is connected between a cathode of the photodiode 101 and a floating diffusion (FD) portion 106. A gate of the transfer transistor 102 is connected to a transfer control line 111 that is supplied with a transfer gate pulse TG. A drain of the reset transistor 103 is connected to a power supply Vdd, whereas a source and a gate thereof are connected to the FD portion 106 and a reset control line 112 that is supplied with a reset pulse RS, respectively.

A gate of the amplifying transistor 104 is connected to the FD portion 106, whereas a drain and a source thereof are connected to the power supply Vdd and a drain of the selecting transistor 105, respectively. A gate of the selecting transistor 105 is connected to a selection control line 113 that is supplied with a selection pulse SEL, whereas a source thereof is connected to a vertical signal line 216. The vertical signal line 216 is connected to a constant-current source 217 for supplying constant current thereto and is also connected to the column signal processing unit 204.

FIG. 6 is a schematic diagram showing a section of a pixel excluding the amplifying transistor 104 and the selecting transistor 105.

N-type diffusion regions 132, 133, and 134 are formed on a surface of a P-type substrate 131. Additionally, a gate 135 is formed at an upper area between the N-type diffusion regions 132 and 133 on the P-type substrate 131. Furthermore, a gate 136 is formed at an upper area between the N-type diffusion regions 133 and 134. The gates 135 and 136 are formed on the substrate through a gate oxide film ($SiO_2$), not shown.

According to a correspondence between FIGS. 5 and 6, the photodiode 101 is formed by PN junction between the P-type substrate 131 and the N-type diffusion region 132. The transfer transistor 102 is formed by the N-type diffusion region 132, the N-type diffusion region 133, and the gate 135 provided therebetween. The reset transistor 103 is formed by the N-type diffusion region 133, the N-type diffusion region 134, and the gate 136 provided therebetween.

The N-type diffusion region 133 serves as the FD portion 106 and is electrically connected to the gate of the amplifying transistor 104. The N-type diffusion region 134 serving as the drain of the reset transistor 103 is supplied with a power supply potential Vdd. The upper surface of the P-type substrate 131 excluding the photodiode 101 is covered with a light-shielding layer 137.

An operation of a circuit of the pixel 201 will now be described with reference to the sectional view shown in FIG. 6 and a waveform chart shown in FIG. 7.

As shown in FIG. 6, in response to illumination of the photodiode 101 with light, pairs of electrons (−) and positive holes (+) are induced (photoelectric conversion) in accordance with intensity of the light. Referring to FIG. 7, a selection pulse SEL is applied to the gate of the selecting transistor 105 at time T1. At the same time, a reset pulse RS is applied to the gate of the reset transistor 103. As a result, the reset transistor 103 conducts, which resets the FD portion 106 to a power supply potential Vdd at time T2.

In response to resetting of the FD portion 106, a potential of the reset FD portion 106 is output to the vertical signal line 216 through the amplifying transistor 104 as a reset level Vn. This reset level Vn corresponds to a noise component unique to the pixel 201. The reset pulse RS becomes active (a "high (H) level") during a predetermined period (between the time T1 and the time T3). The FD portion 106 is kept in the reset state even after the reset pulse RS shifts into a non-active state (i.e., a "low (L) level") from the active state. The period during which the FD portion 106 is in the reset state corresponds to a reset period.

A transfer gate pulse TG is applied to the gate of the transfer transistor 102 at time T4 with the selection signal SEL being active, in response to which the transfer transistor 102 conducts. The photodiode 101 then performs photoelectric conversion. An accumulated signal charge is transferred to the FD portion 106. As a result, the potential of the FD portion 106 changes in accordance with an amount of the signal charge (between the time T4 and time T5). At this time, the potential of the FD portion 106 is output to the vertical signal line 216 through the amplifying transistor 104 as a signal level Vs (during a signal read period). A difference RSl1 between the signal level Vs and the reset level Vn corresponds to a noise-component-free pixel signal level.

Since more charges are generally accumulated in the photodiode 101 during the reset period when an image of a brighter object is captured than when an image of a darker object is captured, the difference RSI1 on the vertical signal line 216 becomes larger.

Since solid-state image pickup elements, such as CMOS image sensors, use photoexcitation current of a nanoampere (nA) order as a signal, leakage current due to a defect of a semiconducting crystal greatly affects. Accordingly, manufacturing processes for reducing the leakage current, such as a process for manufacturing elements under a more highly cleaned environment than that for general integrated circuits and a process for employing various kinds of annealing processing to reduce a crystal defect, are adopted. However, a small number of pixels having large leakage current or having low luminous sensitivity still exist. It may be difficult to eliminate these pixels. Solid-state image pickup elements having such pixels are those having so-called defective pixels.

Even if there are solid-state image pickup elements having defective pixels, substantially defect-free images can be obtained by correcting the images including signals from the defective pixels on the basis of output signals acquired by pixels neighboring the defective pixels.

Accordingly, in general, CMOS image sensors output image data including signals of defective pixels and perform signal processing on the output image data to correct an image including the signals output from the defective pixels. Japanese Unexamined Patent Application Publication No. 4-160883 discloses a technique for connecting a nonvolatile memory storing position information of a defective pixel to a timing generator and replacing a value output from the defective pixel with a predetermined value determined based on a value of a pixel neighboring the defective pixel at the position of the defective pixel of an image pickup element.

SUMMARY OF THE INVENTION

However, a defective pixel correction method described above uses a memory cell for storing position information of a defective pixel and performs signal processing on output image data. Furthermore, the number of defective pixels to be corrected is restricted by a capacity of the memory cell for storing the defective pixel information.

Accordingly, it is desirable to provide a solid-state image pickup device, a semiconductor device, and a camera system capable of correcting data from a defective pixel or a defective element without addition of a new memory cell or signal processing.

A solid-state image pickup device according to an embodiment of the present invention includes a pixel array in which pixels, each having a photoelectric conversion element and a detecting unit detecting an electric signal acquired by the photoelectric conversion element, are arranged in a matrix form, a signal line that is provided for each vertical column of the pixel array and is connected to the detecting unit through a switching element, a selection line that is provided for each horizontal row of the pixel array and is supplied with a selection pulse that causes the switching element to conduct, a resetting unit that is provided in each of the pixels constituting the pixel array and applies a predetermined potential to the detecting unit of the pixel, and an output control unit that is provided in each of the pixels constituting the pixel array and causes the switching element of the pixel to conduct in accordance with the selection pulse supplied to another selection line connected to another switching element of another pixel that belongs to a row different from that of the pixel.

A camera system according to another embodiment of the present invention includes a pixel array in which pixels, each having a photoelectric conversion element and a detecting unit detecting an electric signal acquired by the photoelectric conversion element, are arranged in a matrix form, a signal line that is provided for each vertical column of the pixel array and is connected to the detecting unit through a switching element, a selection line that is provided for each horizontal row of the pixel array and is supplied with a selection pulse that causes the switching element to conduct, a resetting unit that is provided in each of the pixels constituting the pixel array and applies a predetermined potential to the detecting unit of the pixel, an output control unit that is provided in each of the pixels constituting the pixel array and causes the switching element of the pixel to conduct in accordance with the selection pulse supplied to another selection line connected to another switching element of another pixel that belongs to a row different from that of the pixel, and an optical system that leads incident light to the pixel array.

The resetting unit applies the predetermined potential to the detecting unit of the pixel, whereby the predetermined potential is applied to the detecting unit of the pixel regardless of the magnitude of the electric signal acquired by the photoelectric conversion element. Accordingly, since the detecting unit of the pixel having the functioning resetting unit is kept in the reset state and the electric signal acquired by the photoelectric conversion element of the pixel is not output, the pixel is inactivated. Here, the "predetermined potential" indicates a potential for resetting the detecting unit.

Additionally, the output control unit causes the switching element of the pixel to conduct in accordance with the selection pulse supplied to the other selection line connected to the other switching element of the other pixel that belongs to the row different from that of the pixel, thereby being able to cause the switching element of the pixel to conduct in response to application of the selection pulse for causing the other switching element of the other pixel belonging the row different from that of the pixel to conduct. Accordingly, regarding a pixel having the functioning output control unit, data of the pixel is read out at a readout timing of the other pixel belonging to the row different from that of the pixel. The data of the pixel is also read out at an original readout timing of the pixel.

If data of a specific pixel belonging to a row different from that of the pixel is read out while the output control unit is functioning, the read out pixel signals may overlap. More specifically, a pixel signal read out from the pixel having the functioning output control unit and a pixel signal read out from the specific pixel belonging to the row different from that of the pixel overlap. Accordingly, when the output control unit of the pixel is functioning, the resetting unit of the specific pixel belonging to the row different from that of the pixel is caused to function.

By functioning the output control unit of the pixel and functioning the resetting unit of the specific pixel belonging to the row different from that of the pixel, data of the specific pixel belonging to the row different from that of the pixel can be corrected based on the pixel signal read out from the pixel.

A semiconductor device according to still another embodiment of the present invention includes an element array in which elements, each performing a predetermined operation in response to application of a selection signal, are regularly arranged, an inactivating unit that is provided in each of the elements constituting the element array and inactivates the predetermined operation of the element, and an activating unit that is provided in each of the elements constituting the element array and causes the element to perform the predetermined operation in response to application of the selection signal to a predetermined element arranged near the element.

The inactivating unit inactivates the predetermined operation of the pixel, whereby the function of the pixel having the functioning inactivating unit is inactivated. For example, regarding an example case where the element is a photoelectric conversion element, an electric signal acquired by the photoelectric conversion element having the functioning inactivating unit is reset, whereby the function of the photoelectric conversion element is inactivated.

Here, the "element" indicates a photoelectric conversion element, a liquid crystal driving element, and so forth that is regularly arranged and physical position information thereof is important. Accordingly, the "element" used herein does not include an element (e.g., a memory element) for simply storing information regardless of the physical position information.

The activating unit causes the element to perform the predetermined operation in response to application of the selection signal to a predetermined element arranged near the element, whereby the element performs the predetermined operation at a timing that the predetermined element performs the predetermined operation. The element also performs the predetermined operation at an original timing that the element performs the predetermined operation.

If the predetermined element arranged near the element performs the predetermined operation while the activating unit is functioning, the elements for performing the predetermined operation overlap. More specifically, the predetermined operation of the element having the functioning activating unit and the predetermined operation of the predetermined element arranged near the element overlap. Accordingly, when the activating unit of the pixel is functioning, the inactivating unit of the predetermined element arranged near the pixel is caused to function.

By functioning the activating unit of the element and functioning the inactivating unit of the predetermined pixel, correction can be performed based on the predetermined operation of the pixel when the predetermined element is defective.

A solid-state image pickup device, a semiconductor device, and a camera system according to embodiments of the present invention can correct data of a defective pixel or a defective element without addition of a new memory cell and signal processing.

BRIEF DESCRIPTION OF THE DRAWINGS

FIG. 3A is a schematic diagram for illustrating a driving method of a CMOS image sensor according to an embodiment of the present invention;

FIG. 7 is a waveform chart for illustrating an operation of a circuit of a pixel.

DESCRIPTION OF THE PREFERRED EMBODIMENTS

For understanding of the present invention, embodiments of the present invention will be described below with reference to the accompanying drawings.

Figure 1:
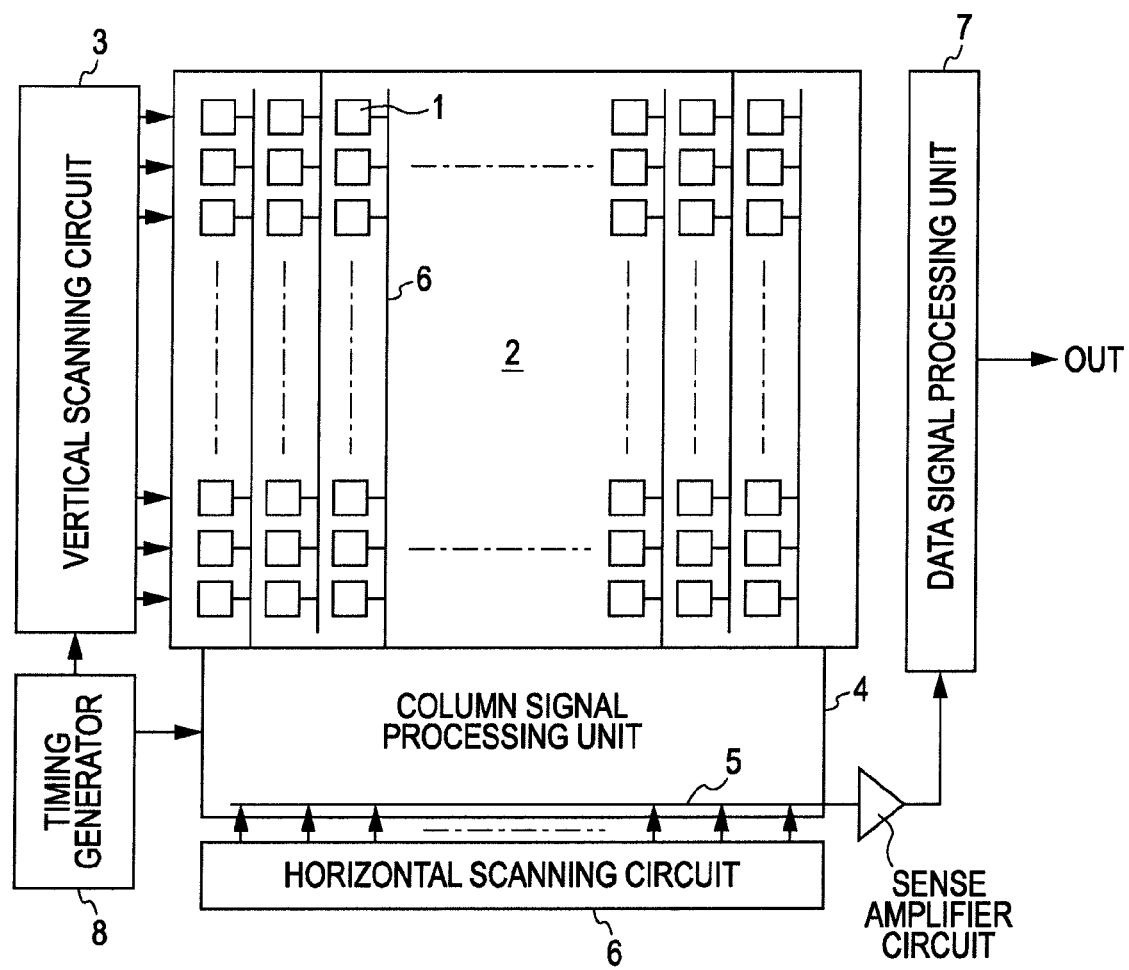
FIG. 1 is a schematic diagram for illustrating a CMOS image sensor according to an embodiment of the present invention.

FIG. 1 is a schematic diagram for illustrating a CMOS image sensor, which is an example of a solid-state image pickup device according to an embodiment of the present invention. The CMOS image sensor shown in this drawing includes a pixel array 2 in which many pixels 1 each having a photoelectric conversion element are arranged in a matrix form, and a vertical scanning circuit 3 for selecting each pixel in the pixel array 2 on a row-by-row basis to control a shutter operation and a read operation of the pixel. The CMOS image sensor also includes a column signal processing unit 4 for reading out a signal from the pixel array 2 and performs predetermined signal processing (e.g., CDS processing, AGC processing, and analog/digital conversion processing) on a column-by-column basis. Furthermore, the CMOS image sensor includes a horizontal scanning circuit 6 for selecting a signal of the column signal processing unit 4 one by one and supplies the selected signal to a horizontal signal line 5, and a data signal processing unit 7 for converting the signal from the horizontal signal line 5 into data of an intended output format. Moreover, the CMOS image sensor includes a timing generator 8 for supplying various pulse signals used in an operation of each unit on the basis of a reference clock.

Figure 2A:
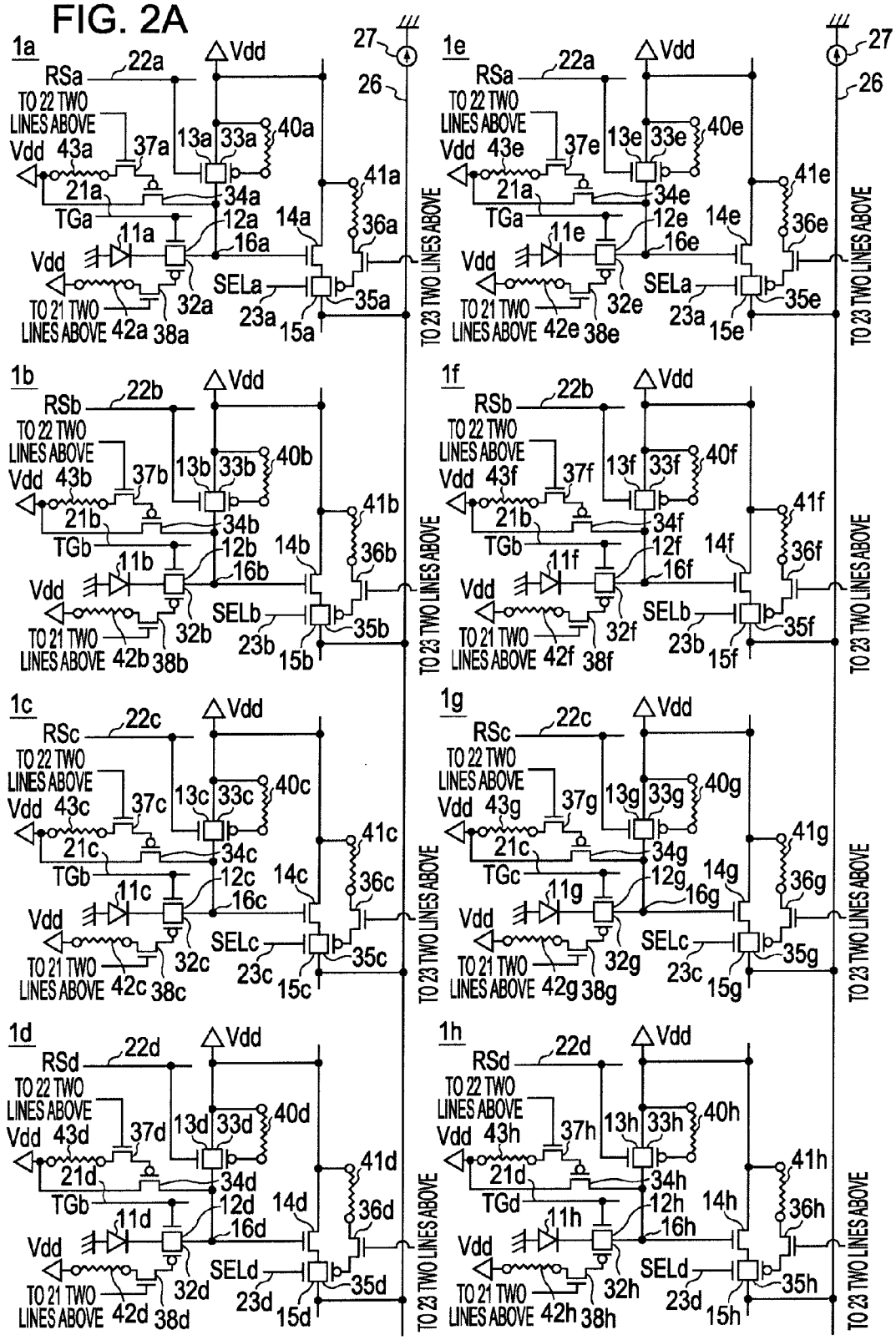
FIG. 2A is a schematic diagram for illustrating an pixel array.

As shown in FIG. 2A, each of the pixels 1 (1a-1h) in the pixel array 2 has a photoelectric conversion element (e.g., photodiode) 11 (11a-11h), a first transfer transistor 12 (12a-12h), a first reset transistor 13 (13a-13h), an amplifying transistor 14 (14a-14h), and a first selecting transistor 15 (15a-15h). In this embodiment, an example circuit that uses N-channel MOS (NMOS) transistors as the transistors 12-15 is shown.

In this embodiment, it is assumed that the pixels 1a and 1c, the pixels 1b, 1d, 1e, and 1g, and the pixels 1f and 1h are for detecting red, green, and blue, respectively.

Each pixel 1 also includes a second transfer transistor 32 (32a-32h), a second reset transistor 33 (33a-33h), a third reset transistor 34 (34a-34h), and the second selecting transistor 35 (35a-35h). Furthermore, each pixel 1 includes a first auxiliary transistor 36 (36a-36h), a second auxiliary transistor 37 (37a-37h), and a third auxiliary transistor 38 (38a-38h). In this embodiment, an example circuit that uses P-channel MOS (PMOS) transistors as the second transfer transistor 32, the second reset transistor 33, the third reset transistor 34, and the second selecting transistor 35 and that uses N-channel MOS (NMOS) transistors as the first auxiliary transistor 36, the second auxiliary transistor 37, and the third auxiliary transistor 38 is shown. The first and second selecting transistors 15 and 35 serve as an example of switching elements.

The first transfer transistor 12 is connected between a cathode of the photodiode 11 and a floating diffusion (FD) portion 16 (16a-16h). A gate of the first transfer transistor 12 is connected to a transfer control line 21 (21a-21d) that is supplied with a transfer gate pulse TG (TGa-TGd). The second transfer transistor 32 is connected between the cathode of the photodiode 11 and the FD portion 16. A gate of the second transfer transistor 32 is connected to one end of the third auxiliary transistor 38.

Another end of the third auxiliary transistor 38 is connected to a power supply Vdd through a third fuse 42 (42a-

42*h*), whereas a gate thereof is connected to the transfer control line 21 located two lines above. More specifically, the gates of the third auxiliary transistors 38*c* and 38*g* are connected to the transfer control line 21*a*. The gates of the third auxiliary transistors 38*d* and 38*h* are connected to the transfer control line 21*b*. The third fuse 42 is connected to a pull-down resistor (not shown). When the third fuse 42 is disconnected, a signal level becomes low (L).

A drain of the first reset transistor 13 is connected to the power supply Vdd, whereas a source and a gate thereof are connected to the FD portion 16 and a reset control line 22 (22*a*-22*d*) that is supplied with a reset pulse RS (RSa-RSd), respectively. The FD portion 16 is an example of a detecting unit.

A drain of the second reset transistor 33 is connected to the power supply Vdd, whereas a source and a gate thereof are connected to the FD portion 16 and the power supply Vdd through a first fuse 40, respectively. The first fuse 40 is connected to a pull-down resistor (not shown). When the first fuse 40 is disconnected, a signal level becomes low (L).

A drain of the third reset transistor 34 is connected to the power supply Vdd, whereas a source thereof is connected to the FD portion 16. One end of the second auxiliary transistor 37 is connected to a gate of the third reset transistor 34, whereas another end thereof is connected to the power supply Vdd through a fourth fuse 43. A gate of the second auxiliary transistor 37 is connected to the reset control line 22 located two lines above. More specifically, the gates of the second auxiliary transistors 37*c* and 37*g* are connected to the reset control line 22*a*. The gates of the second auxiliary transistors 37*d* and 37*h* are connected to the reset control line 22*b*. The fourth fuse 43 is connected to a pull-down resistor (not shown). When the fourth fuse 43 is disconnected, a signal level becomes low (L).

A gate of the amplifying transistor 14 is connected to the FD portion 16, a drain and a source thereof are connected to the power supply Vdd and a drain of the first selecting transistor 15, respectively. A gate of the first selecting transistor 15 is connected to a selection control line 23 (23*a*-23*d*) that is supplied with a selection pulse SEL (SELa-SELd), whereas a source thereof is connected to a vertical signal line 26. The vertical signal line 26 is connected to the column signal processing unit 4 and a constant-current source 27 for supplying constant current thereto.

A drain of the second selecting transistor 35 is connected to the source of the amplifying transistor 14, whereas a source thereof is connected to the vertical signal line 26. One end of the first auxiliary transistor 36 is connected to the gate of the second selecting transistor 35, whereas another end is connected to the power supply Vdd through a second fuse 41. A gate of the first auxiliary transistor 36 is connected to the selection control line 23 located two lines above. More specifically, the gates of the first auxiliary transistors 36*c* and 36*g* are connected to the selection control line 23*a*. The gates of the first auxiliary transistors 36*d* and 36*h* are connected to the selection control line 23*b*. The second fuse 41 is connected to a pull-down resistor (not shown). When the second fuse 41 is disconnected, a signal level becomes low (L).

In this embodiment, the pixels 1*c*, 1*d*, 1*g*, and 1*h* function as correction pixels of the pixels 1*a*, 1*b*, 1*e*, and 1*f*, respectively. More specifically, although an example configuration for correcting a defective pixel with a pixel of the same color is shown, the defective pixel does not have to be corrected with the pixel of the same color (a pixel having the same spectral sensitivity) and may be corrected with a pixel of a different color.

Although an example for correcting a defective pixel with a pixel of the same color is described in the embodiment, the defective pixel and the correction pixel are preferably located as close as possible and the correction pixel is preferably a neighboring pixel since the correction pixel detects a signal level instead of the defective pixel. However, since the CMOS image sensor collectively reads out signals from pixels in the same row in general, the defective pixel and the correction pixel are preferably located at different rows.

Additionally, although an example configuration for correcting a defective pixel with a pixel connected to the same vertical signal line is described in this embodiment, the defective pixel does not have to be corrected with the pixel connected to the same vertical signal line and may be corrected with a pixel connected to a different vertical signal line. However, when the defective pixel is corrected with the pixel connected to the same vertical signal line, a signal level of the correction pixel is output from the same vertical signal line as the vertical signal line that outputs a signal level of the defective pixel. Accordingly, particular signal processing is not performed.

A defective pixel correction method of the CMOS image sensor having the above-described configuration will be described below. The description will be given below for a case where the pixels 1*a* and 1*f* are defective.

In the defective pixel correction method of the CMOS image sensor, [1] inactivation of the pixel 1*a* and [2] activation of a correction function of the pixel 1*c* for correcting data of the pixel 1*a* are performed to correct data of the defective pixel 1*a*.

[1. Inactivation of Pixel 1*a*]

Figure 2B:
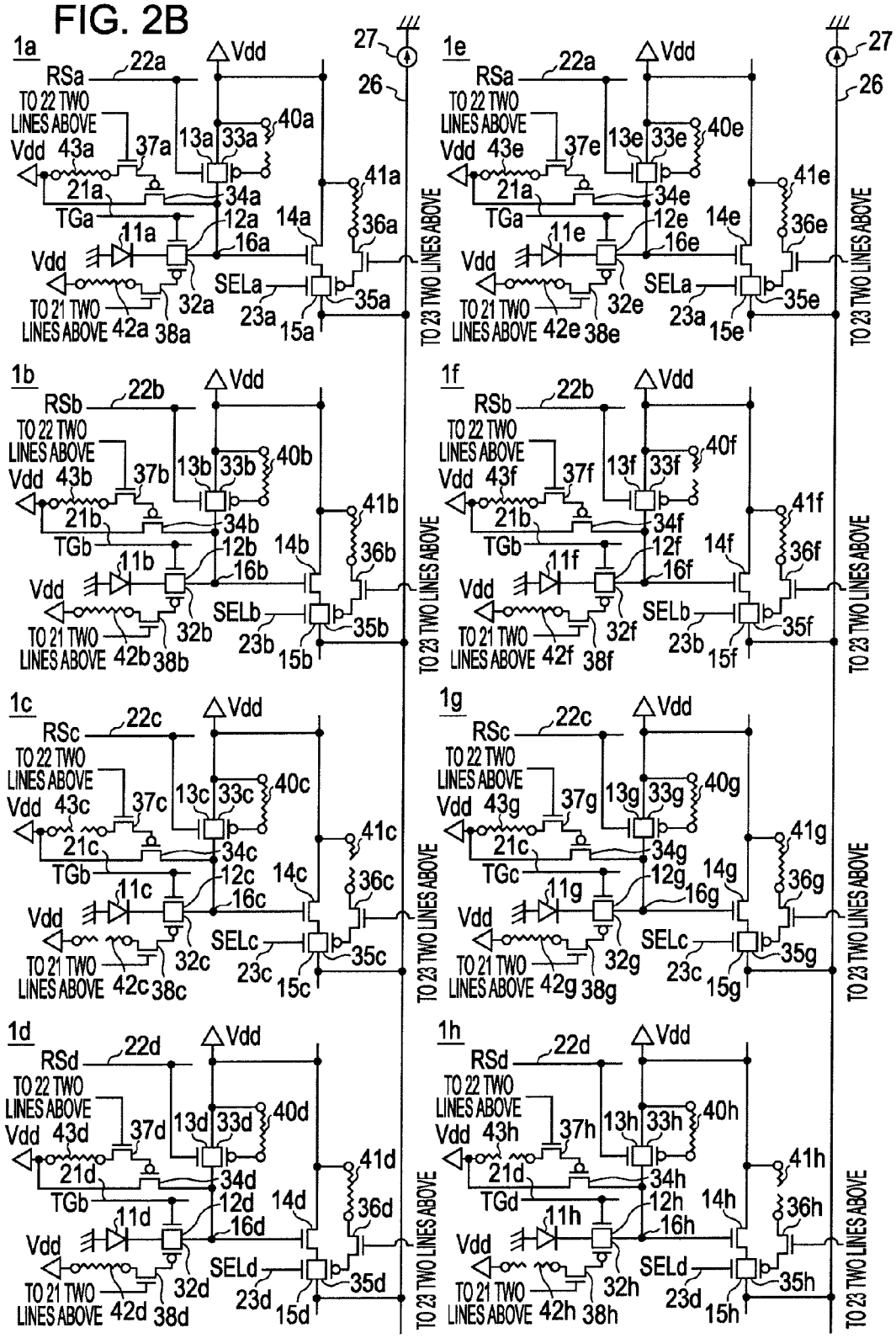
FIG. 2B is a schematic diagram for illustrating a defective pixel correction method of a CMOS image sensor according to an embodiment of the present invention.

To inactivate the pixel 1*a*, the first fuse 40*a* is disconnected (see FIG. 2B). As a method for disconnecting the first fuse 40*a*, a method for burning out the first fuse 40*a* with laser or a method for applying overcurrent to a given address may be used.

In response to disconnection of the first fuse 40*a*, an L-level signal is applied to the gate of the second reset transistor 33*a*. When the L-level signal is applied to the gate of the second reset transistor 33*a*, the second reset transistor 33*a* conducts. Accordingly, the FD portion 16*a* is reset. When the FD portion 16*a* is reset, the pixel 1*a* does not function. Accordingly, the pixel 1*a* can be inactivated by disconnecting the first fuse 40*a*.

[2. Activation of Correction Function of Pixel 1*c* for Correcting Data of Pixel 1*a*]

To activate the correction function of the pixel 1*c* for correcting data of the pixel 1*a*, the second, third, and fourth fuses 41*c*, 42*c*, and 43*c* are disconnected, respectively (see FIG. 2B). As a method for disconnecting the second, third, and fourth fuses 41*c*, 42*c*, and 43*c*, a method for burning out the fuses with laser or a method for applying overcurrent to a given address may be used.

In response to disconnection of the second fuse 41*c*, the second selecting transistor 35*c* operates in accordance with the selection pulse SELa. More specifically, when the selection pulse SELa is high (H), the second selecting transistor 35*c* conducts. When the selection pulse SELa is low (L), the second selecting transistor 35*c* does not conduct (insulated state).

In response to disconnection of the third fuse 42*c*, the second transfer transistor 32*c* operates in accordance with the transfer gate pulse TGa. More specifically, when the transfer gate pulse TGa is high (H), the second transfer transistor 32*c* conducts. When the transfer gate pulse TGa is low (L), the second transfer transistor 32*c* does not conduct (insulated state).

Furthermore, in response to disconnection of the fourth fuse 43c, the third reset transistor 34c operates in accordance with the reset pulse RSa. More specifically, when the reset pulse RSa is high (H), the third reset transistor 34c conducts. When the reset pulse RSa is low (L), the third reset transistor 34c does not conduct (insulated state).

Accordingly, the correction function of the pixel 1c for correcting data of the pixel 1a can be activated by disconnecting the second, third, and fourth fuses 41c, 42c, and 43c, respectively.

To correct the defective pixel if, [1] inactivation of the pixel 1f and [2] activation of a correction function of the pixel 1h for correcting data of the pixel 1f are then performed.

[1. Inactivation of Pixel 1f]

To inactivate the pixel 1f, the first fuse 40f is disconnected (see FIG. 2B).

In response to disconnection of the first fuse 40f, an L-level signal is applied to the gate of the second reset transistor 33f. When the L-level signal is applied to the gate of the second reset transistor 33f, the second reset transistor 33f conducts. Accordingly, the FD portion 16f is reset. When the FD portion 16f is reset, the pixel if does not function. Thus, the pixel if can be inactivated by disconnecting the first fuse 40f.

[2. Activation of Correction Function of Pixel 1h for Correcting Data of Pixel 1f]

To activate the correction function of the pixel 1h for correcting data of the pixel 1f, the second, third, and fourth fuses 41h, 42h, and 43h are disconnected, respectively (see FIG. 2B).

In response to disconnection of the second fuse 41h, the second selecting transistor 35h operates in accordance with the selection pulse SELb. More specifically, when the selection pulse SELb is high (H), the second selecting transistor 35h conducts. When the selection pulse SELb is low (L), the second selecting transistor 35h does not conduct (insulated state).

In response to disconnection of the third fuse 42h, the second transfer transistor 32h operates in accordance with the transfer gate pulse TGb. More specifically, when the transfer gate pulse TGb is high (H), the second transfer transistor 32h conducts. When the transfer gate pulse TGb is low (L), the second transfer transistor 32h does not conduct (insulated state).

Furthermore, in response to disconnection of the fourth fuse 43h, the third reset transistor 34h operates in accordance with the reset pulse RSb. More specifically, when the reset pulse RSb is high (H), the third reset transistor 34h conducts. When the reset pulse RSb is low (L), the third reset transistor 34h does not conduct (insulated state).

Accordingly, the correction function of the pixel 1h for correcting data of the pixel 1f can be activated by disconnecting the second, third, and fourth fuses 41h, 42h, and 43h, respectively.

A driving method of the CMOS image sensor having the above-described configuration will now be described below with reference to each pulse timing chart shown in FIGS. 3A and 3B. A "signal line potential 1" in FIGS. 3A and 3B indicates a potential of the vertical signal line 26 connected to the pixels 1a-1d, whereas a "signal line potential 2" indicates a potential of the vertical signal line 26 connected to the pixels 1e-1h.

A description will be first given for a case where data of the defective pixels of the CMOS image sensor is not corrected (see FIG. 3A). More specifically, the description will be given for a case where the first fuses (40a and 40f), the second fuses (41c and 41h), the third fuses (42c and 42h), and the fourth fuses (43c and 43h) are not disconnected.

When data of the defective pixels of the CMOS image sensor are not corrected, the selection pulse SELa and the reset pulse RSa are simultaneously set to be high (H) at time t1. In response to this change, the first reset transistors 13a and 13e conduct. The FD portions 16a and 16e are reset to a power supply potential Vdd at time t2.

In response to resetting of the FD portions 16a and 16e, potentials of the reset FD portions 16a and 16e are output to the vertical signal lines 26 through the amplifying transistors 14a and 14e as a reset level Vn, respectively. This reset level Vn corresponds to a noise component unique to the pixel. At this time, the reset pulse RSa is high (H) during a predetermined period (between the time t1 and time t3). The FD portions 16a and 16e are kept in the reset state even after the reset pulse RSa shifts into the L-level from the H-level. A period during which the FD portions are kept in the reset state corresponds to a reset period.

By setting the transfer gate pulse TGa to be high (H) at time t4 while keeping the selection signal SELa high (H), the first transfer transistors 12a and 12e conduct. In this manner, the photodiodes 11a and 11e perform photoelectric conversion and the accumulated signal charges are transferred to the FD portions 16a and 16e, respectively. As a result, the potentials of the FD portions 16a and 16e change in accordance with an amount of the signal charges (between the time t4 and time t5). The potentials of the FD portions 16a and 16e at this time are output to the vertical signal line 26 through the amplifying transistors 14a and 14e as a signal level Vs, respectively (during a signal read period). A difference between the signal level Vs and the reset level Vn corresponds to a noise-component-free pixel signal level.

In the manner described above, the signal levels of the pixels 1a and 1e are detected. Signal levels of the pixels 1b and 1f are then detected.

More specifically, the selection pulse SELa, the selection pulse SELb, and the reset pulse RSb are simultaneously set to be low (L), high (H), and high (H) at time t6, respectively. In response to this change, the first reset transistors 13b and 13f conduct. The FD portions 16b and 16f are reset to the power supply potential Vdd at time t7.

In response to resetting of the FD portions 16b and 16f, potentials of the reset FD portions 16b and 16f are output to the vertical signal lines 26 through the amplifying transistors 14b and 14f as the reset level Vn, respectively. The reset pulse RSb is high (H) during a predetermined period (between the time t6 and time t8). The FD portions 16b and 16f are kept in the reset state even after the reset pulse RSb shifts into the L-level from the H-level.

By setting the transfer gate pulse TGb to be high (H) at time t9 while keeping the selection signal SELb high (H), the first transfer transistors 12b and 12f conduct. In this manner, the photodiodes 11b and 11f perform photoelectric conversion and the accumulated signal charges are transferred to the FD portions 16b and 16f, respectively. As a result, the potentials of the FD portions 16b and 16f change in accordance with an amount of the signal charges (between the time t9 and time t10). The potentials of the FD portions 16b and 16f at this time are output to the vertical signal line 26 through the amplifying transistors 14b and 14f as the signal level Vs, respectively.

In the manner described above, the signal levels of the pixels 1b and if are detected. Signal levels of the pixels 1c and 1g are then detected.

More specifically, the selection pulse SELb, the selection pulse SELc, and the reset pulse RSc are simultaneously set to low (L), high (H), and high (H) at time t11, respectively. In response to this change, the first reset transistors 13c and 13g conduct. The FD portions 16c and 16g are reset to the power supply potential Vdd at time t12.

In response to resetting of the FD portions 16c and 16g, potentials of the reset FD portions 16c and 16g are output to the vertical signal lines 26 through the amplifying transistors 14c and 14g as the reset level Vn, respectively. The reset pulse RSc is high (H) during a predetermined period (between the time t11 and time t13). The FD portions 16c and 16g are kept in the reset state even after the reset pulse RSc shifts into the L-level from the H-level.

By setting the transfer gate pulse TGc to be high (H) at time t14 while keeping the selection signal SELc high (H), the first transfer transistors 12c and 12g conduct. In this manner, the photodiodes 11c and 11g perform photoelectric conversion and the accumulated signal charges are transferred to the FD portions 16c and 16g, respectively. As a result, the potentials of the FD portions 16c and 16g change in accordance with an amount of the signal charges (between the time t14 and time t15). The potentials of the FD portions 16c and 16g at this time are output to the vertical signal lines 26 through the amplifying transistors 14c and 14g as the signal level Vs, respectively.

In the manner described above, the signal levels of the pixels 1c and 1g are detected. Signal levels of the pixels 1d and 1h are then detected.

More specifically, the selection pulse SELc, the selection pulse SELd, and the reset pulse RSd are simultaneously set to be low (L), high (H), and high (H) at time t16, respectively. In response to this change, the first reset transistors 13d and 13h conduct. The FD portions 16d and 16h are reset to the power supply potential Vdd at time t17.

In response to resetting of the FD portions 16d and 16h, potentials of the reset FD portions 16d and 16h are output to the vertical signal lines 26 through the amplifying transistors 14d and 14h as the reset level Vn, respectively. The reset pulse RSd is high during a predetermined period (between the time t16 and time t18). The FD portions 16d and 16h are kept in the reset state even after the reset pulse RSd shifts into the L-level from the H-level.

By setting the transfer gate pulse TGd high (H) at time t19 while keeping the selection signal SELd high (H), the first transfer transistors 12d and 12h conduct. In this manner, the photodiodes 11d and 11h perform photoelectric conversion and the accumulated signal charges are transferred to the FD portions 16d and 16h, respectively. As a result, the potentials of the FD portions 16d and 16h change in accordance with an amount of the signal charges (between the time t19 and time t20). The potentials of the FD portions 16d and 16h at this time are output to the vertical signal lines 26 through the amplifying transistors 14d and 14h as the signal level Vs, respectively.

In the manner described above, the signal levels of the pixels 1d and 1h are detected.

The signal levels of the pixels 1 (1a-1h) are detected through the above-described process when data of the defective pixels of the CMOS image sensor is not corrected.

Figure 3B:
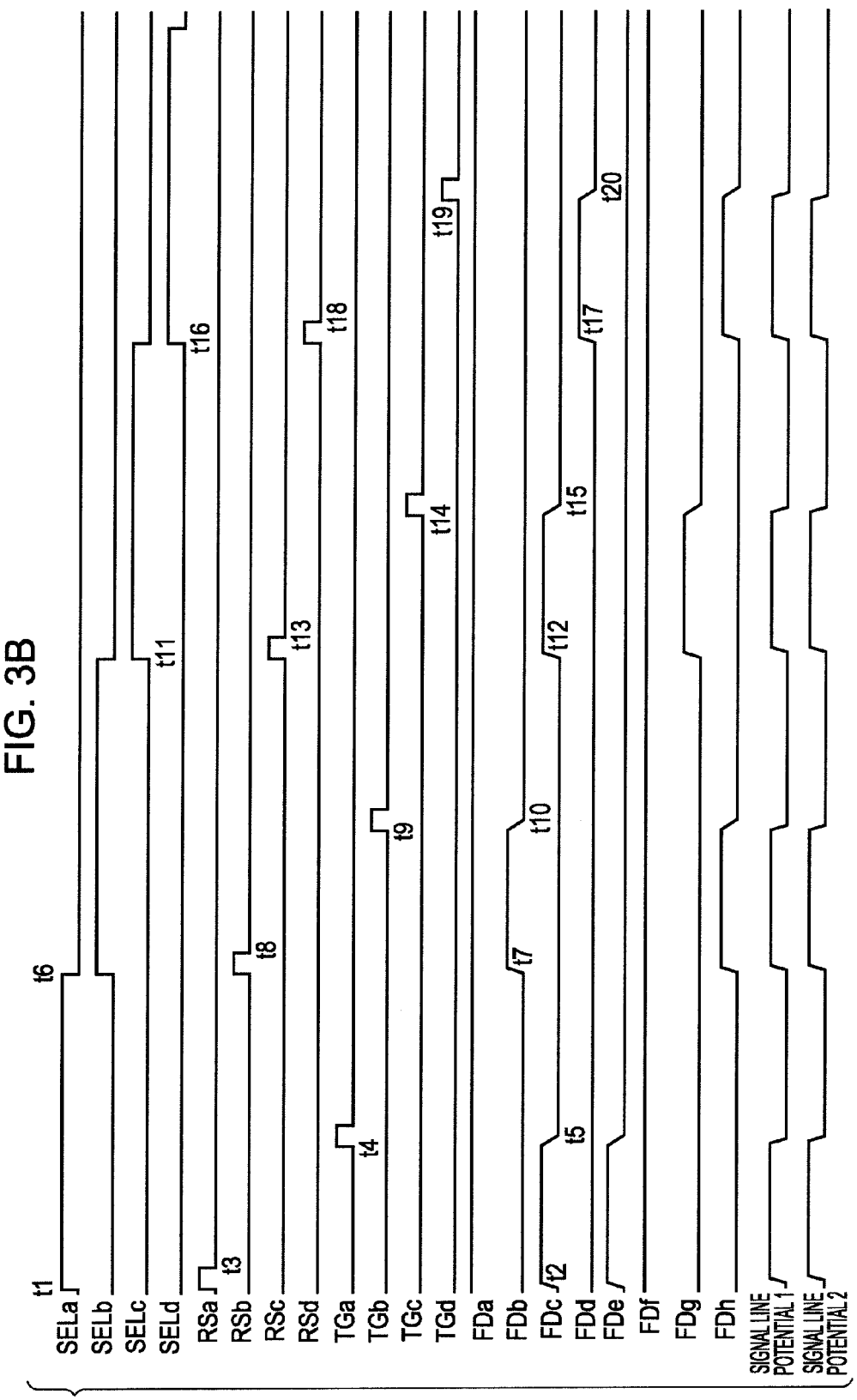
FIG. 3B is another schematic diagram for illustrating a driving method of a CMOS image sensor according to an embodiment of the present invention.
Figure 4:
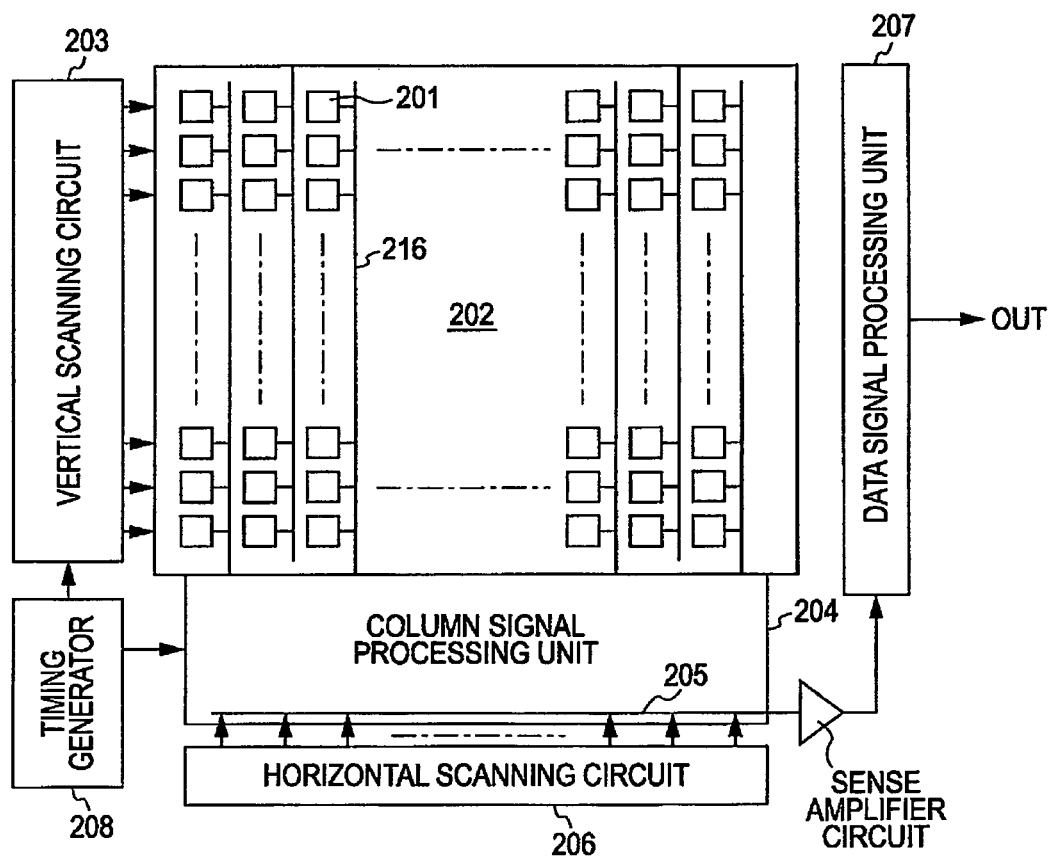
FIG. 4 is a schematic diagram for illustrating a CMOS image sensor.
Figure 5:
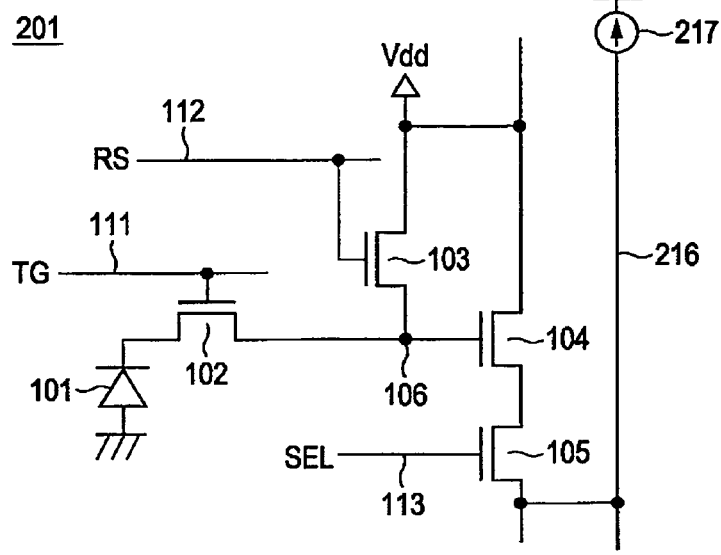
FIG. 5 is a schematic diagram for illustrating a pixel.
Figure 6:
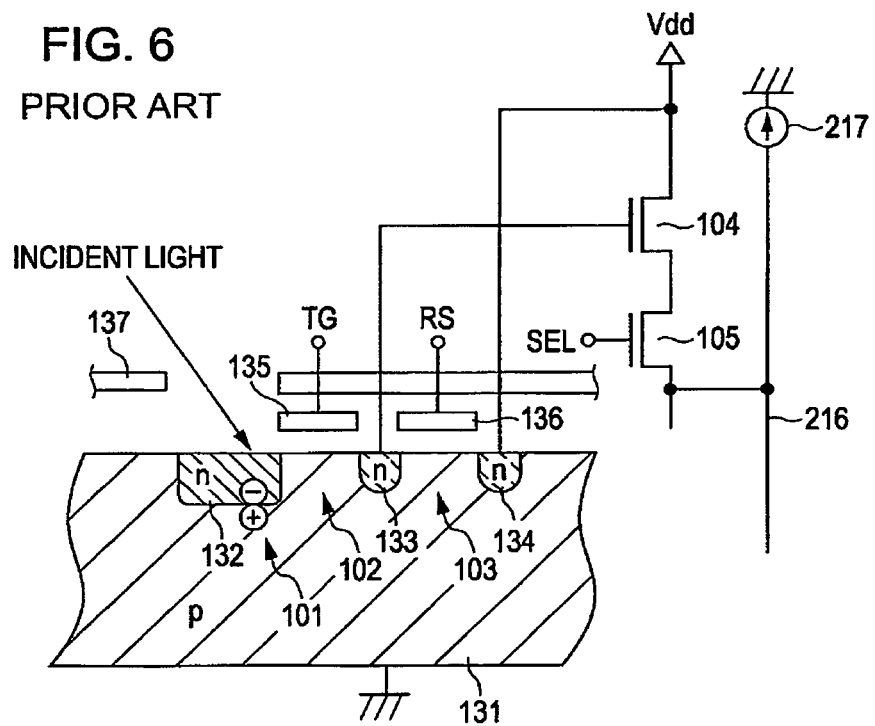
FIG. 6 is a schematic diagram for illustrating a sectional structure of a pixel.

A description will be now given for a case where data of the defective pixels of the CMOS image sensor is corrected (see FIG. 3B). More specifically, the description will be given for a case where the first fuses (40a and 40f), the second fuses (41c and 41h), the third fuses (42c and 42h), and the fourth fuses (43c and 43h) are disconnected.

When data of the defective pixels of the CMOS image sensor is corrected, the selection pulse SELa and the reset pulse RSa are simultaneously set to be high (H) at time t1. In this response to this change, the third reset transistor 34c and the first reset transistor 13e conduct. The FD portions 16c and 16e are reset to the power supply potential Vdd at time t2.

In response to resetting of the FD portions 16c and 16e, potentials of the FD portions 16c and 16e are output to the vertical signal lines 26 through the amplifying transistors 14c and 14e as the reset level potential Vn, respectively. The reset pulse RSa is high (H) during a predetermined period (between the time t1 and time t3). The FD portions 16c and 16e are in the reset state even after the reset pulse RSa shifts into the L-level from the H-level. A period during which the FD portions are in the reset state corresponds to a reset period.

By setting the transfer gate pulse TGa high (H) at time t4 while keeping the selection signal SELa high (H), the second transfer transistor 32c and the first transfer transistor 12e conduct. In this manner, the photodiodes 11c and 11e perform photoelectric conversion and the accumulated signal charges are transferred to the FD portions 16c and 16e, respectively. As a result, the potentials of the FD portions 16c and 16e change in accordance with an amount of the signal charges (between the time t4 and time t5). The potentials of the FD portions 16c and 16e at this time are output to the vertical signal lines 26 through the amplifying transistors 14c and 14e as the signal level Vs, respectively (during a signal read period).

In the manner described above, the signal level of the pixel 1c serving as the correction pixel of the pixel 1a and the signal level of the pixel 1e are detected. Signal levels of the pixel 1b and the pixel 1h that serves as the correction pixel of the pixel 1f are then detected.

More specifically, the selection pulse SELa, the selection pulse SELb, and the reset pulse RSb are simultaneously set to be low (L), high (H), and high (H) at time t6. In response to this change, the first reset transistor 13b and the third reset transistor 34h conduct. The FD portions 16b and 16h are reset to the power supply potential Vdd at time t7.

In response to resetting of the FD portions 16b and 16h, potentials of the reset FD portions 16b and 16h are output to the vertical signal lines 26 through the amplifying transistors 14b and 14h as the reset level Vn, respectively. The reset pulse RSb is high (H) during a predetermined period (between the time t6 and time t8). The FD potions 16b and 16h are kept in the reset state even after the reset pulse RSb shifts into the L-level from the H-level.

By setting the transfer gate pulse TGb high (H) at time t9 while keeping the selection signal SELb high (H), the first transfer transistor 12b and the second transfer transistor 32h conduct. In this manner, the photodiodes 11b and 11h perform photoelectric conversion and the accumulated signal charges are transferred to the FD portions 16b and 16h, respectively. As a result, the potentials of the FD portions 16b and 16h change in accordance with an amount of the signal charges (between the time t9 and time t10). The potentials of the FD portions 16b and 16h at this time are output to the vertical signal lines 26 through the amplifying transistors 14b and 14h as the signal level Vs, respectively.

In the manner described above, the signal levels of the pixel 1b and the pixel 1h that serves as the correction pixel of the pixel 1f are detected. Signal levels of the pixels 1c and 1g are then detected.

More specifically, the selection pulse SELb, the selection pulse SELc, and the reset pulse RSc are simultaneously set to be low (L), high (H), and high (H) at time t11, respectively. In response to this change, the first reset transistors 13c and 13g conduct. The FD portions 16c and 16g are reset to the power supply potential Vdd at time t12.

In response to resetting of the FD portions 16c and 16g, potentials of the reset FD portions 16c and 16g are output to the vertical signal lines 26 through the amplifying transistors 14c and 14g as the reset level Vn, respectively. The reset pulse RSc is high (H) during a predetermined period (between the time t11 and time t13). The FD potions 16c and 16g are kept in the reset state even after the reset pulse RSc shifts into the L-level from the H-level.

By setting the transfer gate pulse TGc high (H) at time t14 while keeping the selection signal SELc high (H), the first transfer transistors 12c and 12g conduct. In this manner, the photodiodes 11c and 11g perform photoelectric conversion and the accumulated signal charges are transferred to the FD portions 16c and 16g, respectively. As a result, the potentials of the FD portions 16c and 16g change in accordance with an amount of the signal charges (between the time t14 and time t15). The potentials of the FD portions 16c and 16g at this time are output to the vertical signal lines 26 through the amplifying transistors 14c and 14g as the signal level Vs, respectively.

In the manner described above, the signal levels of the pixels 1c and 1g are detected. Signal levels of the pixels 1d and 1h are then detected.

More specifically, the selection pulse SELc, the selection pulse SELd, and the reset pulse RSd are simultaneously set to be low (L), high (H), and high (H) at time t16, respectively. In response to this change, the first reset transistors 13d and 13h conduct. The FD portions 16d and 16h are reset to the power supply potential Vdd at time t17.

In response to resetting of the FD portions 16d and 16h, potentials of the reset FD portions 16d and 16h are output to the vertical signal lines 26 through the amplifying transistors 14d and 14h as the reset level Vn, respectively. The reset pulse RSd is high (H) during a predetermined period (between the time t16 and time t18). The FD potions 16d and 16h are kept in the reset state even after the reset pulse RSd shifts into the L-level from the H-level.

By setting the transfer gate pulse TGd high (H) at time t19 while keeping the selection signal SELd high (H), the first transfer transistors 12d and 12h conduct. In this manner, the photodiodes 11d and 11h perform photoelectric conversion and the accumulated signal charges are transferred to the FD portions 16d and 16h, respectively. As a result, the potentials of the FD portions 16d and 16h change in accordance with an amount of the signal charges (between the time t19 and time t20). The potential of the FD portions 16d and 16h at this time are output to the vertical signal lines 26 through the amplifying transistors 14d and 14h as the signal level Vs, respectively.

In the manner described above, the signal levels of the pixels 1d and 1h are detected.

The CMOS image sensor according to the above-described embodiment of the present invention disconnects the first, second, third, and fourth fuses 40a, 41c, 42c, and 43c, respectively, to correct data of the defective pixel 1a with data of the pixel 1c. Accordingly, data of the defective pixel 1a can be corrected with data of the pixel 1c without adding a new memory cell or subsequent signal processing. Similarly, the CMOS image sensor disconnects the first, second, third, and fourth fuses 40f, 41h, 42h, and 43h, respectively, to correct data of the defective pixel 1f with data of the pixel 1h. Accordingly, data of the defective pixel 1f can be corrected with data of the pixel 1h without adding a new memory cell or subsequent signal processing.

Although the description has been given for a CMOS image sensor as an example in this embodiment, a semiconductor device capable of adopting a configuration for correcting data of a defective pixel with data of a neighboring pixel may be used and the application scope of the present invention should not be limited to the CMOS image sensor.

The present application contains subject matter related to that disclosed in Japanese Priority Patent Application JP 2008-252262 filed in the Japan Patent Office on Sep. 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image pickup device comprising:
a pixel array in which pixels, each having a photoelectric conversion element and a detecting unit detecting an electric signal acquired by the photoelectric conversion element, are arranged in a matrix form;
a signal line that is provided for each vertical column of the pixel array and is connected to the detecting unit through a switching element;
a selection line that is provided for each horizontal row of the pixel array and is supplied with a selection pulse that causes the switching element to conduct;
a resetting unit that is provided in each of the pixels constituting the pixel array and applies a predetermined potential to the detecting unit of the pixel; and
an output control unit that is provided in each of the pixels constituting the pixel array and causes the switching element of the pixel to conduct in accordance with the selection pulse supplied to another selection line connected to another switching element of another pixel that belongs to a row different from that of the pixel, and wherein the output control unit selectively activates an auxiliary pixel to replace a deactivated defective pixel, and further wherein the deactivated pixel is disabled such that it does not provide an output signal and the activated auxiliary pixel is a pixel that only provides a pixel output that is substituted for the output of the corresponding deactivated pixel.

2. The device according to claim 1, wherein the pixel and the other pixel that belongs to the row different from that of the pixel are connected to the same signal line.

3. The device according to claim 1, wherein the pixel and the other pixel that belongs to the row different from that of the pixel have the same spectral sensitivity.

4. The device according to claim 1, wherein the pixel and the other pixel that belongs to the row different from that of the pixel are neighboring pixels.

5. The solid-state image pickup device according to claim 1, wherein deactivation of a defective pixel is comprised of disconnecting at least one fuse connection.

6. The solid-state image pickup device according to claim 1, wherein activation of a replacement pixel is comprised of disconnecting at least one fuse connection.

7. The solid-state image pickup device according to claim 1, wherein deactivation of a defective pixel and activation of a replacement pixel is comprised of disconnecting at least two fuse connections.

8. The solid-state image pickup device according to claim 1, wherein at least some of the pixels have more than one replacement pixel.

9. A semiconductor device comprising:
an element array in which elements, each performing a predetermined operation in response to application of a selection signal, are regularly arranged;
a deactivating unit that is provided in each of the elements constituting the element array and deactivates the predetermined operation of the element; and an activating unit that is provided in each of the elements constituting the element array and causes the element to perform the predetermined operation in response to application of the selection signal to an auxiliary element arranged near the element, and further wherein the deactivated element is disabled such that it does not provide an output signal and the activated auxiliary element only provides an output that is substituted for the output of the corresponding deactivated element.

10. The semiconductor device according to claim 9, wherein deactivation of a defective element is comprised of disconnecting at least one fuse connection.

11. The semiconductor device according to claim 9, wherein activation of a replacement element is comprised of disconnecting at least one fuse connection.

12. The semiconductor device according to claim 9, wherein deactivation of a defective element and activation of a replacement element is comprised of disconnecting at least two fuse connections.

13. The semiconductor device according to claim 9, wherein at least some of the elements have more than one replacement element.

14. A camera system comprising:
a pixel array in which pixels, each having a photoelectric conversion element and a detecting unit detecting an electric signal acquired by the photoelectric conversion element, are arranged in a matrix form;
a signal line that is provided for each vertical column of the pixel array and is connected to the detecting unit through a switching element;
a selection line that is provided for each horizontal row of the pixel array and is supplied with a selection pulse that causes the switching element to conduct;
a resetting unit that is provided in each of the pixels constituting the pixel array and applies a predetermined potential to the detecting unit of the pixel;
an output control unit that is provided in each of the pixels constituting the pixel array and causes the switching element of the pixel to conduct in accordance with the selection pulse supplied to another selection line connected to another switching element of another pixel that belongs to a row different from that of the pixel, and wherein the output control unit selectively activates an auxiliary pixel to replace a deactivated defective pixel, and further wherein the deactivated pixel is disabled such that it does not provide an output signal and the activated auxiliary pixel is a pixel that only provides a pixel output that is substituted for the output of the corresponding deactivated pixel; and
an optical system that leads incident light to the pixel array.

15. The camera system according to claim 14, wherein deactivation of a defective pixel is comprised of disconnecting at least one fuse connection.

16. The camera system according to claim 14, wherein activation of a replacement pixel is comprised of disconnecting at least one fuse connection.

17. The camera system according to claim 14, wherein deactivation of a defective pixel and activation of a replacement pixel is comprised of disconnecting at least two fuse connections.

18. The camera system according to claim 6, wherein at least some of the pixels have more than one replacement pixel.

* * * * *